United States Patent
Witczak et al.

(10) Patent No.: US 10,976,424 B2
(45) Date of Patent: Apr. 13, 2021

(54) AUTOMATIC DETERMINATION OF POSITION AND ORIENTATION OF ELEVATOR DEVICE ENTRY TERMINALS AND HALLWAY FIXTURES

(71) Applicant: Otis Elevator Company, Farmington, CT (US)

(72) Inventors: Tadeusz Pawel Witczak, Farmington, CT (US); Craig Drew Bogli, Avon, CT (US); Stella M. Oggianu, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 103 days.

(21) Appl. No.: 16/022,741

(22) Filed: Jun. 29, 2018

(65) Prior Publication Data
US 2020/0003880 A1   Jan. 2, 2020

(51) Int. Cl.
| | | |
|---|---|---|
| G01S 11/06 | (2006.01) | |
| B66B 1/34 | (2006.01) | |
| B66B 3/00 | (2006.01) | |
| G01C 21/08 | (2006.01) | |

(52) U.S. Cl.
CPC .......... G01S 11/06 (2013.01); B66B 1/3492 (2013.01); B66B 3/006 (2013.01); G01C 21/08 (2013.01)

(58) Field of Classification Search
CPC ....... G01S 11/06; G01C 21/08; B66B 1/3492; B66B 3/006
USPC ................... 455/456.1–456.6, 457
See application file for complete search history.

(56) References Cited

U.S. PATENT DOCUMENTS

| | | |
|---|---|---|
| 7,077,244 B2 | 7/2006 | Oh et al. |
| 7,699,143 B2 | 4/2010 | Tschuemperlin et al. |
| 7,731,000 B2 | 6/2010 | Oh et al. |
| 7,760,132 B1* | 7/2010 | Markhovsky ........... G01S 13/87 340/539.13 |
| 8,356,698 B2 | 1/2013 | Zepke et al. |
| 8,485,317 B2 | 7/2013 | Gerstenkorn et al. |
| 2007/0002813 A1* | 1/2007 | Tenny ................... H04W 64/00 370/338 |

(Continued)

FOREIGN PATENT DOCUMENTS

| | | |
|---|---|---|
| CN | 104355193 B | 8/2016 |
| EP | 1900672 B1 | 3/2008 |

(Continued)

OTHER PUBLICATIONS

Extened European Search Report for Application No. 19183690.7-1017 / 3594161, dated Dec. 18, 2019, 8 pages.

*Primary Examiner* — Mazda Sabour
(74) *Attorney, Agent, or Firm* — Cantor Colburn LLP

(57) ABSTRACT

A system to determine a location of a signal emitting device is provided. First, second, and third data is received from at least one movable communication device. Each of the first, second, and third data include a unique identifier of the signal emitting device, a signal strength of a signal received by the at least one movable communication device from the signal emitting device, and a location of the at least one movable communication device when it received the signal. Each of the first, second, and third data include different locations of the at least one movable communication device. A location of the signal emitting device is computed based at least in part on the received first, second, and third data.

16 Claims, 4 Drawing Sheets

(56) References Cited

U.S. PATENT DOCUMENTS

| | | | | |
|---|---|---|---|---|
| 2015/0373663 A1* | 12/2015 | Bao | ................ | H04W 64/00 |
| | | | | 455/456.6 |
| 2017/0010342 A1* | 1/2017 | Jovicic | ................ | G01S 1/042 |
| 2017/0024096 A1 | 1/2017 | Anson | | |
| 2017/0187456 A1* | 6/2017 | Siessegger | ......... | H04B 10/1149 |
| 2017/0190543 A1 | 7/2017 | Friedli | | |
| 2017/0303232 A1* | 10/2017 | Austin | ................ | H04W 64/00 |
| 2018/0241489 A1* | 8/2018 | Daoura | ................ | H04W 40/22 |

FOREIGN PATENT DOCUMENTS

| | | |
|---|---|---|
| EP | 3190075 A1 | 7/2017 |
| JP | 2015157664 A | 9/2015 |
| WO | 2017016937 A1 | 2/2017 |
| WO | 20170244096 A1 | 2/2017 |
| WO | 2017055177 A1 | 4/2017 |
| WO | 2019002660 A1 | 1/2019 |

* cited by examiner

AUTOMATIC DETERMINATION OF POSITION AND ORIENTATION OF ELEVATOR DEVICE ENTRY TERMINALS AND HALLWAY FIXTURES

BACKGROUND

The subject matter disclosed herein relates to the field of determining a location of devices in a building, and more particularly relates to an apparatus and method for providing automatic determination of position and orientation of signal emitting devices.

Buildings that have a large number of floors and elevator banks can use destination management software, such as CompassPlus™ from Otis Elevator Company, to direct passengers to a particular elevator car(s). CompassPlus groups passengers and stops, and assigns an elevator car to a group of passengers heading for the same place or series of floors, or zones. Passengers enter their floor destinations in a keypad on a free-standing device entry terminal (DET), in a wall-mounted hallway fixture, or on a mobile device, and the destination management software suggests an elevator and provides directions to the elevator.

Signal emitting devices such as DETs and hallway fixtures may require significant installation time for each individual unit. Along with the physical installation, the installation also includes setting a user identifier (UID) of the DET, a floor location identifier (ID), a location of the DET, and an orientation in a lobby or hallway of the DET with reference to each elevator car or bank of elevators, a distance from the DET to each elevator or bank of elevators, and an estimate travel, or walking, time from the DET to each elevator or bank of elevators. This information is used by the DET to give the passenger instructions about how to get to the assigned elevator car. Similar information may also be required for mobile DET applications, which can provide a common digital user experience to direct a passenger to an elevator car or bank of elevators as that provided by a DET or hallway fixture.

BRIEF SUMMARY

According to an embodiment, a system configured to determine a location of a signal emitting device is provided. The system includes a processor and a memory including computer-executable instructions that, when executed by the processor, cause the processor to perform operations. The operations include receiving first, second, and third data from at least one movable communication device. Each of the first, second, and third data include a unique identifier of the signal emitting device, a signal strength of a signal received by the at least one movable communication device from the signal emitting device, and a location of the at least one movable communication device when it received the signal. Each of the first, second, and third data include different locations of the at least one movable communication device. A location of the signal emitting device is computed based at least in part on the received first, second, and third data In addition to one or more of the features described herein, or as an alternative, further embodiments of the system may include at least one movable communication device that is attached to at least one elevator car.

In addition to one or more of the features described herein, or as an alternative, further embodiments of the system may include the first data being received from a first movable communication device and the second data being received from a second movable communication device that is different than the first movable communication device.

In addition to one or more of the features described herein, or as an alternative, further embodiments of the system may include the third data being received from a third movable communication device that is different than the first and second movable communication devices.

In addition to one or more of the features described herein, or as an alternative, further embodiments of the system may include that the operations further include based at least in part on the location of the signal emitting device, computing a distance and direction from the signal emitting device to a destination.

In addition to one or more of the features described herein, or as an alternative, further embodiments of the system may include at least one of the first, second, and third data further including orientation information, and the operations further including determining an orientation of the signal emitting device based at least in part on the received orientation information, where the computing a distance and direction are further based at least in part on the orientation of the signal emitting device.

In addition to one or more of the features described herein, or as an alternative, further embodiments of the system may include the orientation information including a magnetometer reading from the signal emitting device.

In addition to one or more of the features described herein, or as an alternative, further embodiments of the system may include the orientation information including an angle of arrival of the first signal.

In addition to one or more of the features described herein, or as an alternative, further embodiments of the system may include the signal emitting device being a destination system management unit that directs users to elevator cars and the destination is an entry location for an elevator car.

In addition to one or more of the features described herein, or as an alternative, further embodiments of the system may include the location of the signal emitting device being transmitted to the signal emitting device.

In addition to one or more of the features described herein, or as an alternative, further embodiments of the system may include computing a location based at least in part on triangulation.

In addition to one or more of the features described herein, or as an alternative, further embodiments of the system may include the signal emitting device being a destination management system unit.

According to an embodiment, a method of determining a location of a signal emitting device is provided. The method includes receiving first, second, and third data from at least one movable communication device. Each of the first, second, and third data include a unique identifier of the signal emitting device, a signal strength of a signal received by the at least one movable communication device from the signal emitting device, and a location of the at least one movable communication device when it received the signal. Each of the first, second, and third data include different locations of the at least one movable communication device. A location of the signal emitting device is computed based at least in part on the received first, second, and third data In addition to one or more of the features described herein, or as an alternative, further embodiments of the method may include at least one movable communication device is attached to at least one elevator car.

In addition to one or more of the features described herein, or as an alternative, further embodiments of the method may include the first data being received from a first movable communication device and the second data being received from a second movable communication device that is different than the first movable communication device.

In addition to one or more of the features described herein, or as an alternative, further embodiments of the method may include the third data being received from a third movable communication device that is different than the first and second movable communication devices.

In addition to one or more of the features described herein, or as an alternative, further embodiments of the method may include, based at least in part on the location of the signal emitting device, computing a distance and direction from the signal emitting device to a destination.

In addition to one or more of the features described herein, or as an alternative, further embodiments of the method may include at least one of the first, second, and third data further including orientation information, and the operations further including determining an orientation of the signal emitting device based at least in part on the received orientation information, where the computing a distance and direction are further based at least in part on the orientation of the signal emitting device.

In addition to one or more of the features described herein, or as an alternative, further embodiments of the method may include the orientation information including at least one of a magnetometer reading from the signal emitting device and an angle of arrival of the first signal.

In addition to one or more of the features described herein, or as an alternative, further embodiments of the method may include the signal emitting device being a destination system management unit that directs users to elevator cars and the destination is an entry location for an elevator car.

Technical effects of embodiments of the present disclosure include simplified and automated installation of signal emitting devices such as destination management system units that include, but are not limited to hallway fixtures and DETs. Technical effects of embodiments of the present disclosure also include time and cost reductions for the installation of hallway fixtures and DET systems, as well as other building monitoring assets such as but not limited to heating, ventilation, and air conditioning (HVAC) systems and fire/smoke detectors. Additional technical effects of embodiments of the present disclosure include an enhanced mobile experience by automatically determining a current floor. Further technical effects of embodiments of the present disclosure include maintenance time saving.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

One or more embodiments of the present disclosure provide for automatic determination of positions and orientations of signal emitting devices such as, but not limited to, destination management system units for elevators. Destination management system units can include, but are not limited to wall-mounted hallway fixtures and free-standing destination entry terminals (DETs). In accordance with one or more embodiments, wireless communication devices (WCDs) are mounted on elevator cars that travel up and down through a building. The WCDs can scan all the available information from the hoistways and elevator cars, noting their positions while scanning and creating a bank of required information for setting up each individual destination management system for the elevator. One or more embodiments of the present disclosure can be extended to gather additional information in the building and commission other systems pertaining to the building itself such as, but not limited to: security; safety; lighting; and heating, ventilation, and air conditioning (HVAC) systems).

The collected information can include, but is not limited to: a unique identification number for each destination management system unit; a floor number where each destination management system unit is located, obtained for example by referencing the current elevator floor information or by using Z-axis triangulation based on known elevator car positions; location of the destination management unit on the floor, which can be obtained for example by triangulation using mobile and stationary known reference points; and orientation of the destination management unit, obtained for example by destination management system units that transmit their magnetometer readings or by determining the angle of arrival of wireless signals from the destination management system units.

In accordance with one or more embodiments of the present disclosure, a DET or hallway fixture having a wireless presence and knowledge of its exact location can also be used for tracking and detecting mobile smart devices which can be programmed to provide the same service/interface as a stationary DET or a hallway fixture.

Figure 1:
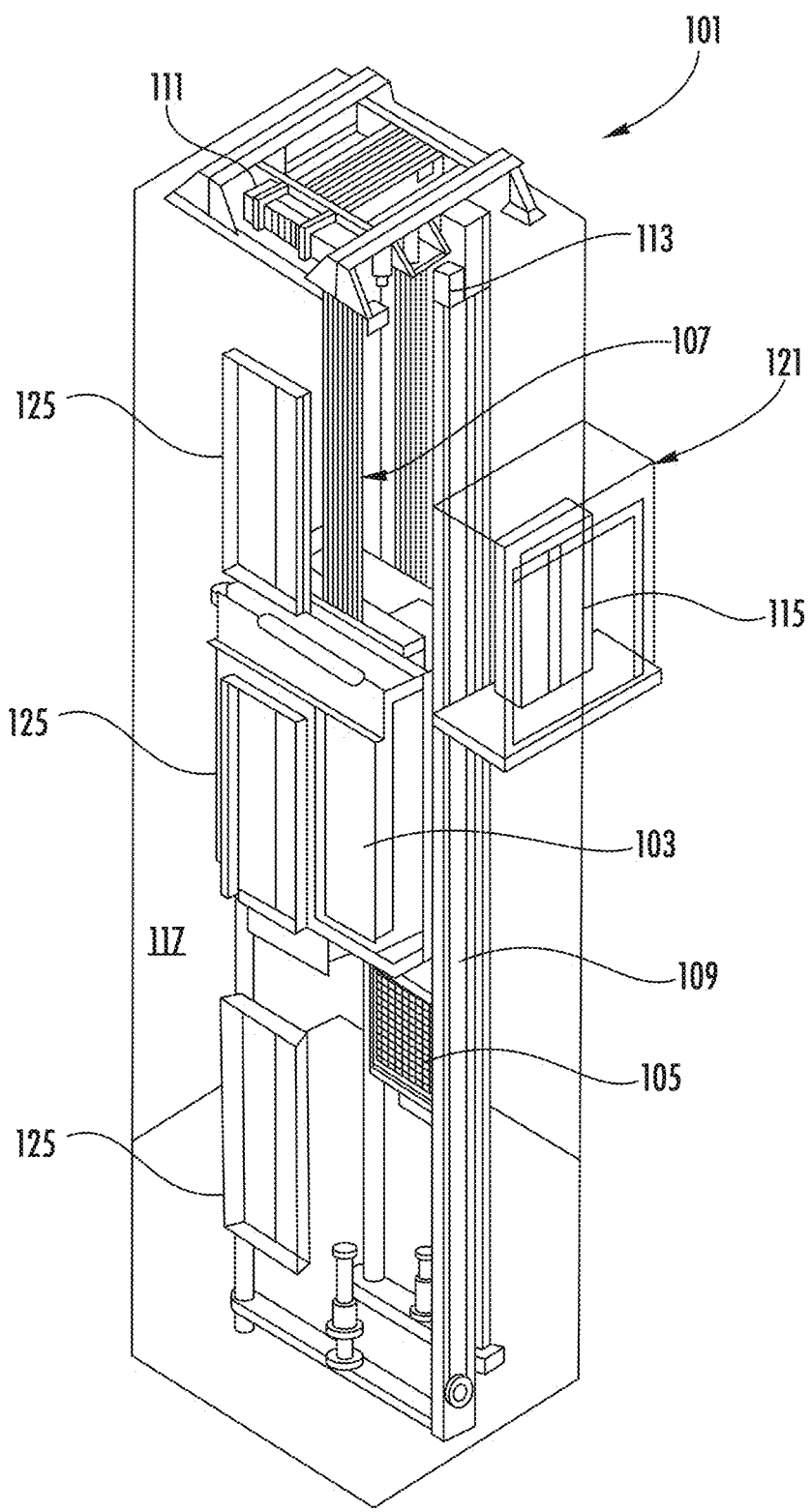
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101.

The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
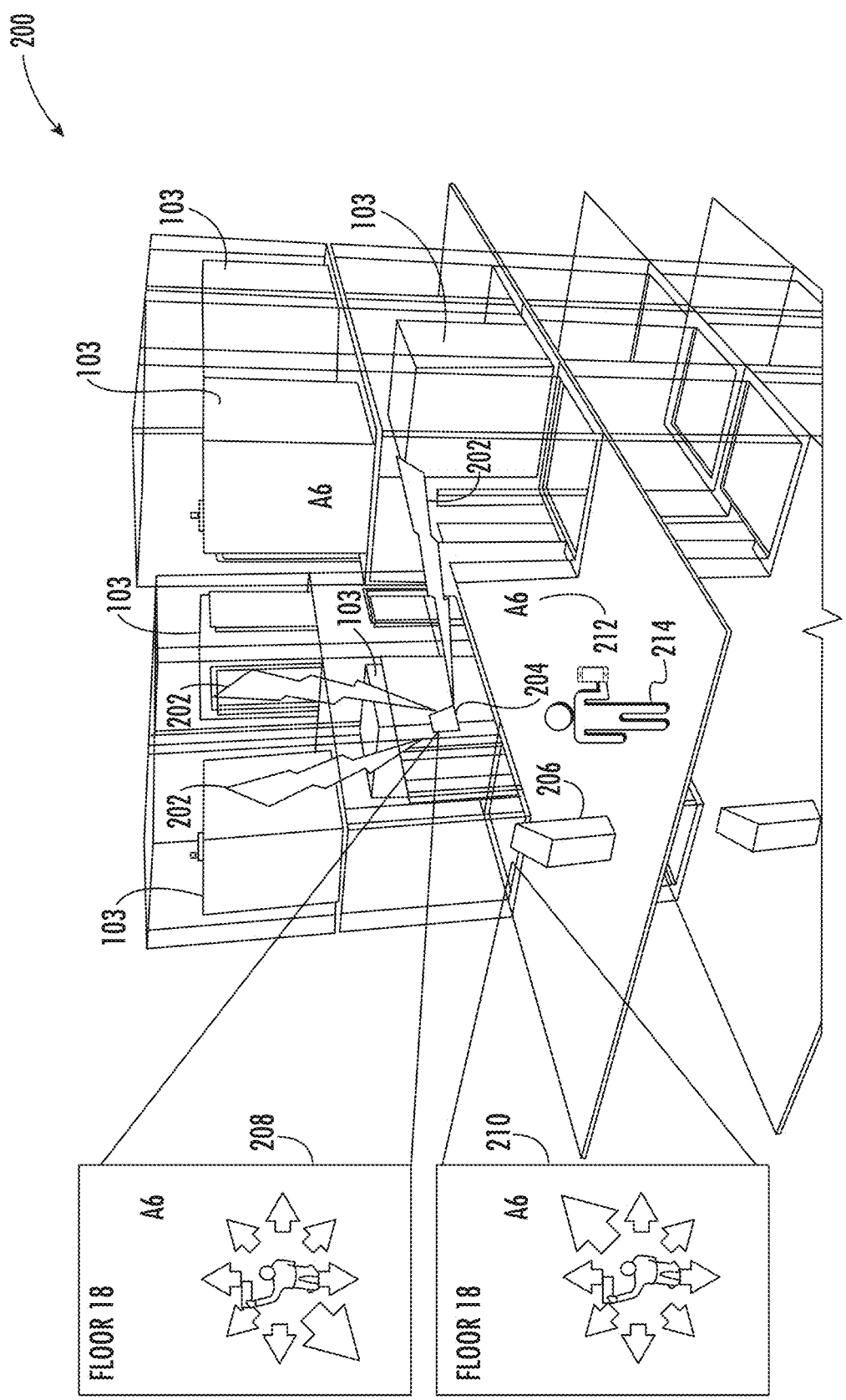
FIG. 2 is a schematic illustration of using an elevator system to provide location data for a destination management system unit in accordance with one or more embodiments of the present disclosure.

Turning now to FIG. 2, a schematic illustration 200 of using an elevator system to provide location data for a destination management system unit is generally shown in accordance with one or more embodiments of the present disclosure. FIG. 2 includes elevator cars 103, a destination location 212 labeled "A6" that corresponds to the location where doors of the elevator car 103 labeled "A6" will open on floor 18, a wall mounted hallway fixture 204 having a display screen 208, a free standing DET 206 having a display screen 210, and a person holding a mobile device 214 that has a display screen. Though the content of the display screen of the mobile device 214 is not shown in FIG. 2, it is similar to display screen 208 and display screen 210 in that it directs the person from their current location to the destination location 212 labeled "A6."

As shown in FIG. 2 signals 202 are exchanged between at least one of the elevator cars 103 and hallway fixture 204. In an embodiment, the three elevator cars 103 include wireless control devices (WCDs) that are at known locations. The positions of the elevator cars 103 are continuously monitored by a controller, such as controller 115 of FIG. 1. In an embodiment, the position of an elevator car 103 is referenced to the position of its WCD. In another embodiment, the WCD device is cable of defining its own position, independently of the elevator car 103, based on sensor readings (e.g., accelerometers). The WCDs broadcast signals 202 that are received by the hallway fixture 204, and the hallway fixture 204 sends return signals 202 back to the WCDs. Protocols used to transmit/receive the signals can include, but are not limited to: Bluetooth Low Energy (BLE), Bluetooth, zWave, Zigbee, and LoRa. In an embodiment, the signal broadcasted by the WCD uses a different protocol, or is a different type of signal, than the signal returned to the WCD. For example, the broadcast signal can be a ranging signal (e.g., RFID) and the return signal can be a data signal (e.g., Bluetooth) containing data messaging, or vice versa. In an embodiment system orientation and localization may be performed only during the configuration of static fixtures.

Mobile devices can be located when sending a request (e.g., a floor call using a mobile DET application). Which mobile devices should be part of the system localization can be defined prior to installation in the configuration or there can be a procedure of adding the devices to the system.

In an embodiment, once a device is located and oriented it can be used (e.g., along with other located and oriented devices) to localize other devices.

In an embodiment, the WCDs transmit information about the return signals to a location calculation module executed for example, by controller 115 of FIG. 1 or by a server located external to the elevator system 101 of FIG. 1. Information about the return signal can include signal strength of the return signal, a unique ID of the hallway fixture 204 sending the signal, and a location of the WCD at the time that the return signal was received. The location calculation module can use this information to calculate the location of the hallway fixture 204 using known methods such as, but not limited to, triangulation. The location can be expressed in three-dimensional coordinates, and translated into building floors and be assigned other labels (e.g., front lobby). The location calculation module can also determine a distance and estimated passenger travel time between the hallway fixture and any elevator cars or banks in the building.

Additional information can be sent to the location calculation module to determine an orientation of the hallway fixture 204. This additional information can include an angle of arrival of the return signal as measured by the WCD or a magnetometer reading received from the hallway fixture 204 in the return signal.

The location and orientation information is used by the destination management software to generate displays such as those shown in FIG. 2. As shown in FIG. 2 display screen 208 points to the destination location 212 labeled "A6"

relative to hallway fixture 204 (e.g., back left 45%), and display screen 210 points to the destination location 212 labeled "A6" relative to the DET 206 (e.g., front right 45%). Directions in this form or other forms such as a map and/or text can be communicated to a user standing at hallway fixture 204 who is looking for the location of elevator A6.

Figure 3:
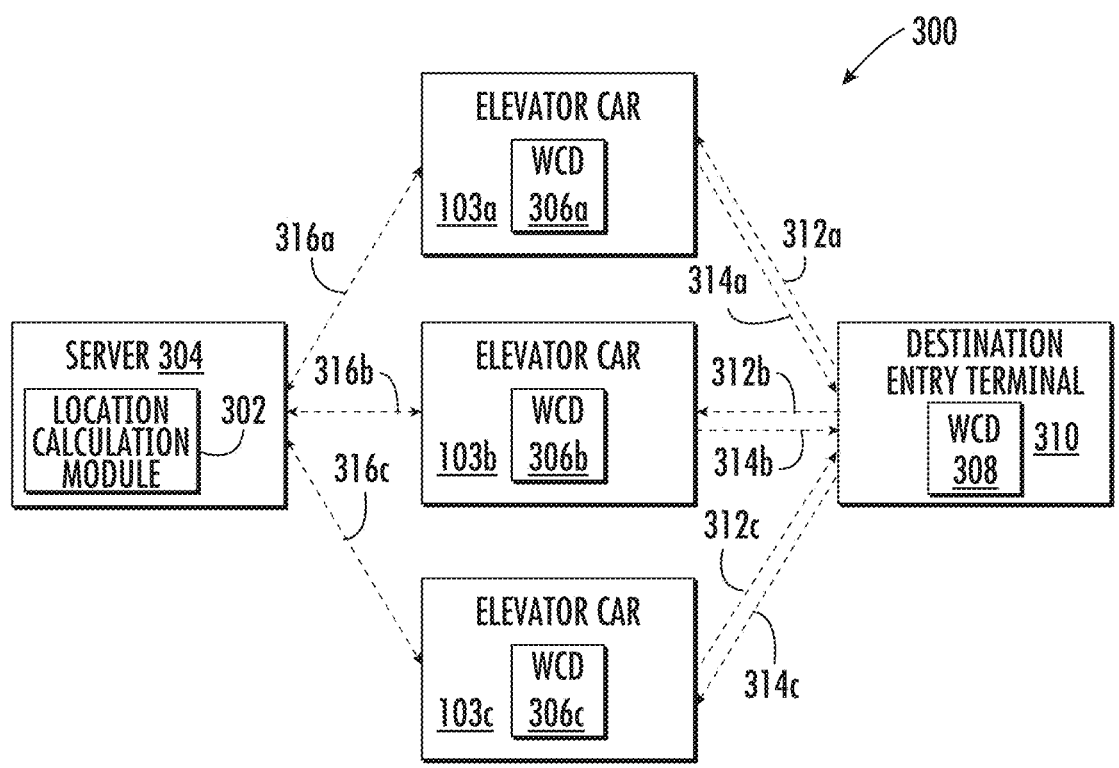
FIG. 3 is a schematic illustration of system for automatic determination of position and orientation of a DET in accordance with one or more embodiments of the present disclosure.

Turning now to FIG. 3, a schematic illustration of a system 300 for automatic determination of position and orientation of a DET is generally shown in accordance with one or more embodiments of the present disclosure. FIG. 3 depicts three elevator cars 103 each having a WCD 306, a server 304, and a DET 310 having a WCD 308. The elevator cars 103 can be in communication with the DET 310 via any short-range wireless communication interface known in the art such as, but not limited to Bluetooth, Zigbee, Wi-Fi, zWave, RFID, BLE, cellular, and infrared. The elevator cars 103 can be in communication with the server 304 via any short or long-range wireless or wired communication methods known in the art over networks such as, but not limited to the Internet, a local area network (LAN), and a wide area network (WAN), Wi-Fi, zWave, RFID, BLE, and cellular.

In one or more embodiments, the WCDs 306 308 are implemented by nodes and gateways using any protocol(s) known in the art. WCDs can be mounted on a variety of devices such as, but not limited to: elevator cars, DETs, kiosks, hall buttons, lanterns, fire sensors, thermostats, and mobile devices.

As shown in FIG. 3, elevator car 103a broadcasts a signal 314b from WCD 306a which is at a known location. Signal 314a is received by DET 310 via WCD 308, and WCD 308 responds to signal 314b by sending a return signal 312a, that includes a unique ID of DET 310, to WCD 306a in elevator car 103a. In an embodiment, WCD 306a, or other hardware and/or software in elevator car 103a determines the signal strength of return signal 312a. In an alternate embodiment, the raw data from the return signal is passed to the server 304 which then determines the signal strength. WCD 306a transmits data 316a to a location calculation module 302 executing on a server 304. In an alternate embodiment, the location calculation module 302 can be executed by a processor not located in the server such as, but not limited to a processor located in the cloud or in an elevator controller. is executing in the In an embodiment, the data 316a includes the unique ID of the DET 310, the determined signal strength, and the location of WCD 306a when it received the return signal 312a.

As shown in FIG. 3, elevator car 103b broadcasts a signal 314b from WCD 306b which is at a known location. Signal 314b is received by DET 310 via WCD 308, and WCD 308 responds to signal 314b by sending a return signal 312b, that includes the unique ID of DET 310, to WCD 306b in elevator car 103b. In an embodiment, WCD 306b, or other hardware and/or software in elevator car 103b determines the signal strength of return signal 312b. WCD 306b transmits data 316b to a location calculation module 302 executing on a server 304. In an embodiment, the data 316b includes the unique ID of the DET 310, the determined signal strength, and the location of WCD 306b when it received the return signal 312b.

Also as shown in FIG. 3, elevator car 103c broadcasts a signal 314c from WCD 306c which is at a known location. Signal 314c is received by DET 310 via WCD 308, and WCD 308 responds to signal 314c by sending a return signal 312c, that includes the unique ID of DET 310, to WCD 306c in elevator car 103c. In an embodiment, WCD 306c, or other hardware and/or software in elevator car 103c determines the signal strength of return signal 312c. WCD 306c transmits data 316c to a location calculation module 302 executing on a server 304. In an embodiment, the data 316c includes the unique ID of the DET 310, the determined signal strength, and the location of WCD 306c when it received the return signal 312c.

The location calculation module 302 determines the location and orientation parameters of the DET 310 based on contents of the data 316. In one or embodiments, the server 304 (or location where the location calculation module 302 is executing) transmits data back to the DET 310 that contains the location and orientation parameters of the DET 310, and optionally additional parameters detailing a distance of the DET 310 from specific elevator cars, an orientation of the DET 310 relative to specific elevator cars, and an estimated travel time to specific elevator cars. In other embodiments, the additional parameters are calculated by a processor executing at the DET 310. As shown in FIG. 3, the data can be transmitted back to the DET 310 via one or more WCDs 306 in the elevator cars 103. In other embodiments, the data is transmitted directly between the server 304 and the DET 310.

As shown in FIG. 3, the server 304 includes the location calculation module 302 to determine locations of destination management system units. Although the server 304 is depicted herein as a single device, it should be appreciated that the server 304 may alternatively be embodied as a multiplicity of systems. It should be appreciated that, although particular elements are separately defined in the schematic block diagram of FIG. 3, each or any of the elements may be otherwise combined or separated via hardware and/or software.

A minimum of three signals from known locations are required by the location calculation module 302 to determine a location of the DET 310. The signals can be received from three (or more) different elevator cars 103 as shown in FIG. 3. The three signals can also all be received from the same elevator car 103 when it is at three different positions. The three signals can be received from any number of elevator cars (one, two, three) as long as each signal is received at a different physical location. When more than three signals are received the additional signals can provide additional accuracy and/or validation. In an alternate embodiment directional receivers are utilized that can determine what vector the signal is coming from, and just a single signal is required to determine a location of the DET 310.

Figure 4:
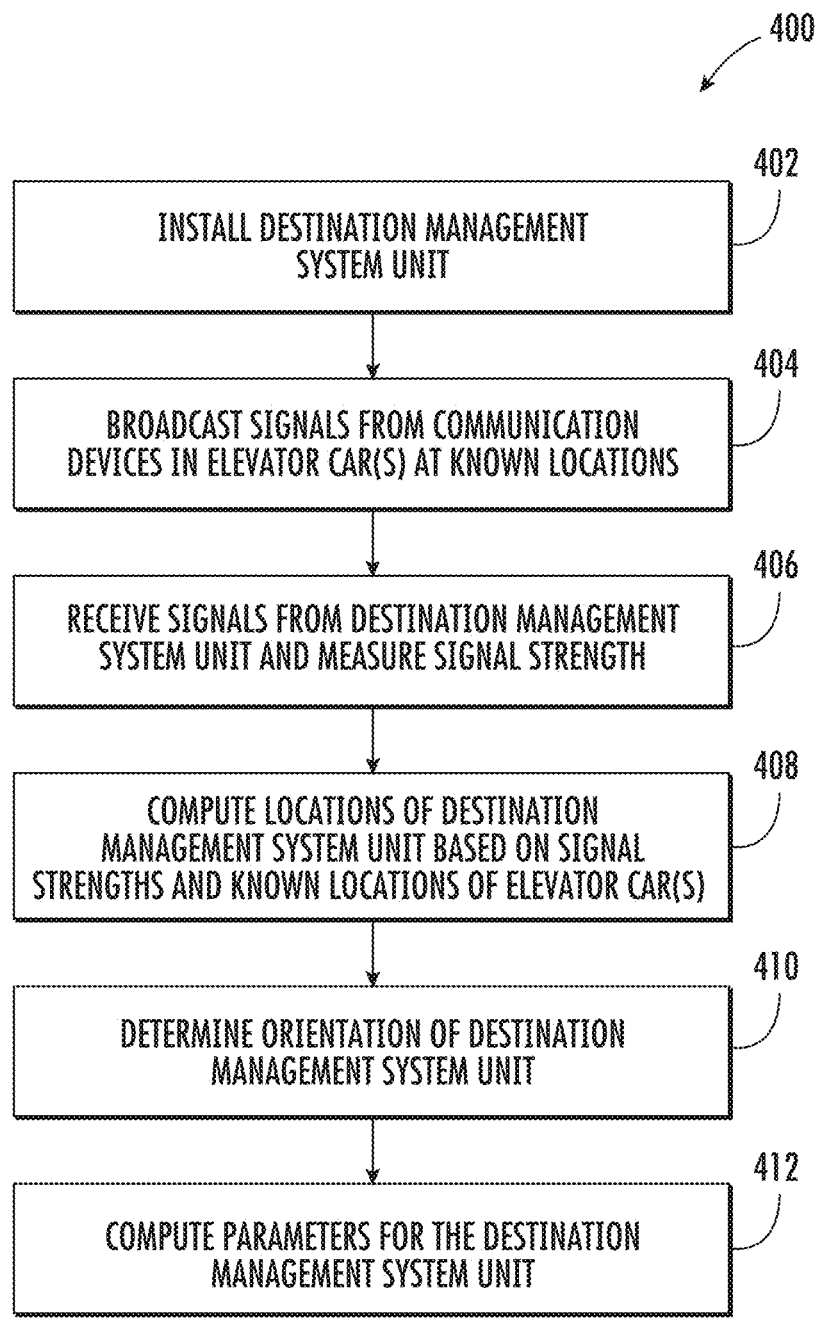
FIG. 4 is a flow diagram illustrating a method of automatic determination of position and orientation of a destination management system unit in accordance with one or more embodiments of the present disclosure.

Turning now to FIG. 4, a flow diagram 400 illustrating a method of automatic determination of position and orientation of a destination management system unit is generally shown in accordance with one or more embodiments of the present disclosure. At block 402, a destination management system unit, such as DET 310 of FIG. 3, is physically installed at a location, such as in a building with elevators. The destination management system unit can include, but is not limited to a DET and a hallway fixture. At block 404, signals, such as signals 314 of FIG. 3, are broadcast from WCDs, such as WCDs 306 of FIG. 3, in elevator cars. At block 406 a return signal, such as return signal 312 of FIG. 3, is received from a WCD, such as WCD 308 of FIG. 3, in the destination management system unit. The WCD, or other hardware/software device in the elevator car determines a signal strength of the return signal and sends data, such as data 316, that includes the signal strength along with an identifier of the destination management system unit and the location of the WCD when it received the return signal to a server, such as server 304 of FIG. 3.

At block 408 of FIG. 4, the location of the destination management system unit is calculated, by for example location calculation module 302 of FIG. 3, based on contents of the received data using triangulation and translating signal strength values into approximate distances. At block 410, an orientation of the destination management system unit is calculated. In one or more embodiments, the orientation is calculated based on a reading from a sensor (e.g., a compass) in the destination management system unit that is included in the return signal to the elevator car and in the data sent to the server. In one or more other embodiments, the WCDs in the elevator cars have antennas that can measure an angle of arrival of a signal from the DET 310 and this information is included in the data sent to the server.

At block 412, parameters for the destination management system unit are calculated. The parameters can include, but are not limited to: location, orientation, a distance from specific elevator cars, an orientation relative to specific elevator cars, and an estimated travel time to specific elevator cars.

In accordance with one or more embodiments, the process of FIG. 4 is performed periodically to validate that none of the destination management system units have changed locations or to adjust the parameters if the location has changed, or is a new one has been added.

In accordance with one or more embodiments, WCDs located in destination management system units are used to track other devices in a building. In an example scenario, elevator cars are used to define locations of devices such as kiosks, DETs, and hall buttons. These devices and their known locations are then used to determine locations of other devices. A group of devices with known locations can be built, taking into account that the precision of the identified locations decreases as the devices are further from the original devices. For example, a location of a second device that is estimated based on a location of a first original device is likely to have a higher accuracy than a location of a third device that is estimated based on the location of the second device.

Contemporary implementations of mobile DET applications may not know the current floor of the user and the user inputs that information into the application. This can occur as follows: user enters current floor number, presses enter, user enters "to" floor number, and presses enter. An embodiment can remove the requirement for the user to enter the current floor number and pressing enter by knowing the current floor of user. A user may have predefined floors, and proposed floors may be presented to the user based on history, current time (lunch—cafeteria floor, down-peak to lobby).

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system configured to determine a location of a signal emitting device, the system comprising:
   a processor; and
   a memory comprising computer-executable instructions that, when executed by the processor, cause the processor to perform operations, the operations comprising:
      receiving first, second, and third data from at least one movable communication device, each of the first, second, and third data comprising a unique identifier of the signal emitting device, a signal strength of a signal received by the at one movable communication device from the signal emitting device, and a location of the at least one movable communication device when it received the signal, each of the first, second, and third data comprising different locations of the at least one movable communication device; and
      computing a location of the signal emitting device based at least in part on the received first, second, and third data;
      wherein the at least one movable communication device is attached to at least one elevator car of an elevator system, and a position of the elevator car is continuously monitored by a controller of the elevator system and used to determine the location of the at least one movable communication device.

2. The system of claim 1, wherein the first data is received from a first movable communication device and the second data is received from a second movable communication device that is different than the first movable communication device.

3. The system of claim 1, wherein the operations further comprise:

based at least in part on the location of the signal emitting device, computing a distance and direction from the signal emitting device to a destination.

4. The system of claim 3, wherein at least one of the first, second, and third data further comprises orientation information, and the operations further comprise determining an orientation of the signal emitting device based at least in part on the received orientation information, wherein the computing a distance and direction are further based at least in part on the orientation of the signal emitting device.

5. The system of claim 4, wherein the orientation information comprises a magnetometer reading from the signal emitting device.

6. The system of claim 4, wherein the orientation information comprises an angle of arrival of the first signal.

7. The system of claim 3, wherein the signal emitting device is a destination system management unit that directs users to elevator cars and the destination is an entry location for an elevator car.

8. The system of claim 1, wherein the location of the signal emitting device is transmitted to the signal emitting device.

9. The system of claim 1, wherein the computing a location is performed based at least in part on triangulation.

10. The system of claim 1, wherein the signal emitting device is a destination management system unit.

11. A method of determining a location of a signal emitting device, the method comprising:

receiving first, second, and third data from at least one movable communication device, each of the first, second, and third data comprising a unique identifier of the signal emitting device, a signal strength of a signal received by the at least one movable communication device from the signal emitting device, and a location of the at least one communication device when it received the signal, each of the first, second, and third data comprising different locations of the at least one movable communication device; and computing a location of the signal emitting device based at least in part on the received first, second, and third data;

wherein the at least one movable communication device is attached to at least one elevator car of an elevator system, and a position of the elevator car is continuously monitored by a controller of the elevator system and used to determine the location of the at least one movable communication device.

12. The method of claim 11, wherein the first data is received from a first movable communication device and the second data is received from a second movable communication device that is different than the first movable communication device.

13. The method of claim 11, further comprising, based at least in part on the location of the signal emitting device, computing a distance and direction from the signal emitting device to a destination.

14. The method of claim 13, wherein at least one of the first, second, and third data further comprises orientation information, and the method further comprises determining an orientation of the signal emitting device based at least in part on the received orientation information, wherein the computing a distance and direction are further based at least in part on the orientation of the destination management unit.

15. The method of claim 14, wherein the orientation information comprises at least one of a magnetometer reading from the signal emitting device and an angle of arrival of the first signal.

16. The method of claim 13, wherein the signal emitting device is a destination management system unit that directs users to elevator cars and the destination is an entry location for an elevator car.

* * * * *